(12) United States Patent
Shimada et al.

(10) Patent No.: US 6,456,909 B1
(45) Date of Patent: Sep. 24, 2002

(54) CONTROL APPARATUS OF ELECTRIC VEHICLE

(75) Inventors: Motomi Shimada; Tetsuo Kojima, both of Hitachinaka; Kiyoshi Nakata, Iwase-machi; Eiichi Toyota; Toshihiko Sekizawa, both of Hitachinaka, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/651,721

(22) Filed: Aug. 30, 2000

(30) Foreign Application Priority Data

Mar. 6, 2000 (JP) ........................................ 2000-065715

(51) Int. Cl.[7] ................................................ B60L 7/00
(52) U.S. Cl. .......................... 701/22; 701/84; 701/90; 318/432; 180/65.1
(58) Field of Search .................... 701/22, 70, 84, 701/90; 180/65.1, 65.2; 318/139, 432

(56) References Cited

U.S. PATENT DOCUMENTS

| | | | | |
|---|---|---|---|---|
| 5,600,215 A | * | 2/1997 | Yamada et al. | 318/139 |
| 5,650,700 A | * | 7/1997 | Mutoh et al. | 318/432 |
| 5,677,610 A | * | 10/1997 | Tanamachi et al. | 318/801 |
| 5,731,669 A | * | 3/1998 | Shimizu et al. | 318/139 |
| 5,757,153 A | * | 5/1998 | Ito et al. | 318/370 |
| 5,775,784 A | * | 7/1998 | Koga et al. | 303/152 |
| 5,896,283 A | * | 4/1999 | Usami | 363/98 |
| 6,018,198 A | * | 1/2000 | Tsuzuki et al. | 290/17 |
| 6,054,776 A | * | 4/2000 | Sumi | 290/17 |
| 6,083,138 A | * | 7/2000 | Aoyama et al. | 477/5 |

FOREIGN PATENT DOCUMENTS

| | | |
|---|---|---|
| JP | 7-7806 | 1/1995 |
| JP | 9-130913 | 5/1997 |
| JP | 9-156898 | 6/1997 |
| JP | 11-234804 | 8/1999 |
| JP | 2000-59902 | 2/2000 |
| WO | WO 98/23461 | 6/1998 |

* cited by examiner

*Primary Examiner*—Tan Nguyen
(74) *Attorney, Agent, or Firm*—Antonelli, Terry, Stout & Kraus, LLP

(57) ABSTRACT

To determine the timing of the electrical brake for completely stopping in electrical braking control, and also to achieve both sure stopping and good riding comfort in an electric vehicle powered by the motor by decreasing the braking force at a prescribed rate of change, the torque of the electric motor is controlled by controlling the power converter which powers the motor using a power converter controller. The deceleration of the motor is computed based on the detected speed of the electric motor which is as an output of the speed detection means, the subsequent speed of the electric motor is estimated based on the detected speed and the deceleration rate of the electric motor at the time the detected rotational speed of the electric motor falls below a prescribed speed, and torque control is carried out using an electric power converter controller, based on the estimated speed.

11 Claims, 5 Drawing Sheets

CONTROL APPARATUS OF ELECTRIC VEHICLE

BACKGROUND OF THE INVENTION

The present invention relates in general to a control apparatus for an electric vehicle, such as an electric railcar and an electric locomotive; and more particularly, the invention relates to an electric vehicle control apparatus which prevents deterioration in riding comfort in the electric vehicle by decreasing the braking force at a prescribed rate of change when stopping the vehicle, and establishes a timing for release of the electric braking such that the electric vehicle stops completely, based on the rotational speed and rotational deceleration of the electric motor of the electric vehicle.

Conventionally, in electric vehicles, it is very common to perform brake control by using both electric brakes and pneumatic brakes, and, in particular, the braking is carried out using only pneumatic brakes from a speed below a specific speed up to a complete stop. This is due to the fact that, since relatively inexpensive pulse generators having a small number of pulses per revolution are being used for detecting the rotational speed of the motor, it is not possible to obtain a speed detection accuracy such that the zero speed point can be determined in a range of an extremely low speed just before stopping; and, hence, while the braking force can not be sufficiently controlled in the range of low speed by the electric brakes, it is possible to surely control the braking force up to stopping when the pneumatic brakes are used. In this case, changeover from electric braking to pneumatic braking is carried out while controlling the brakes so as to make the sum of the two braking forces constant, and an almost constant deceleration force is maintained up to stopping in this way.

JP A 7-7806, which is directed to a "Regenerative braking control method for electric vehicles", discloses a control method in which, when an actual regenerative braking force is applied to pneumatic braking equipment, an attempt is made to achieve smoothness in operation at the time of changing over from the regenerative braking to pneumatic braking by multiplying the actual regenerative braking force by a coefficient, while taking into consideration the delay in the operation of the pneumatic brakes, over the entire range of the braking force command, comprising brake step and variable load conditions.

Further, regarding a method of controlling electric brakes, JP A 11-234804, which is directed to an "Electric Vehicle Reverse Phase Electric Brake Control Method and Equipment", describes a method of detecting zero speed in reverse phase electric braking by detecting that the speed of the electric vehicle has become zero during braking using reverse phase electric braking, while obtaining the braking force by changing over from braking the forward movement to applying a reverse direction driving force as the speed gets reduced.

Although the "Regenerative braking control method for electric vehicles" disclosed in JP A 7-7806 is effective for preventing generation of a shock at the time of changing over from regenerative braking to pneumatic braking, there is the problem that the actual braking force in pneumatic braking can easily change from the command value of braking force due to various conditions, such as the weather, etc., and the ease of carrying out the braking operation becomes poor after changing over from regenerative braking to pneumatic braking. Also, it is desirable for the frequency of use of pneumatic braking to be reduced as much as possible, considering the noise which is generated due to brake screeching at the time of applying the pneumatic brake in the low speed range, and the cost of replacement work of the brake shoes (brake pads).

Further, in the "Electric Vehicle Reverse Phase Electric Brake Control Method and Equipment" disclosed in JP A 11-234804, there is no clear description regarding the method of decreasing the torque, which is considered to have a large effect on the riding comfort during stopping.

SUMMARY OF THE INVENTION

An object of the present invention is to provide a control apparatus for an electric vehicle which is stopped by electric braking, which control apparatus can simultaneously achieve reliable braking and good riding comfort particularly by determining a suitable timing for release of the electric braking such that the electric vehicle stops completely and the braking force is decreased at a specific rate of change to stop the electric vehicle.

The shock which is generated due to sudden changes in braking force is reduced by decreasing the braking force just before stopping at a prescribed or specific rate of change, and the timing for release of the electric brake so as to stop completely is derived on the basis of the rotational speed and rotational deceleration of the electric motor, considering the rate of change of the reduction of the braking force and the delay in detecting the speed.

DESCRIPTION OF EMBODIMENTS OF THE PRESENT INVENTION

A control apparatus for electric vehicle representing an embodiment of the present invention will be described with reference to FIGS. 1 and 2.

Figure 1:
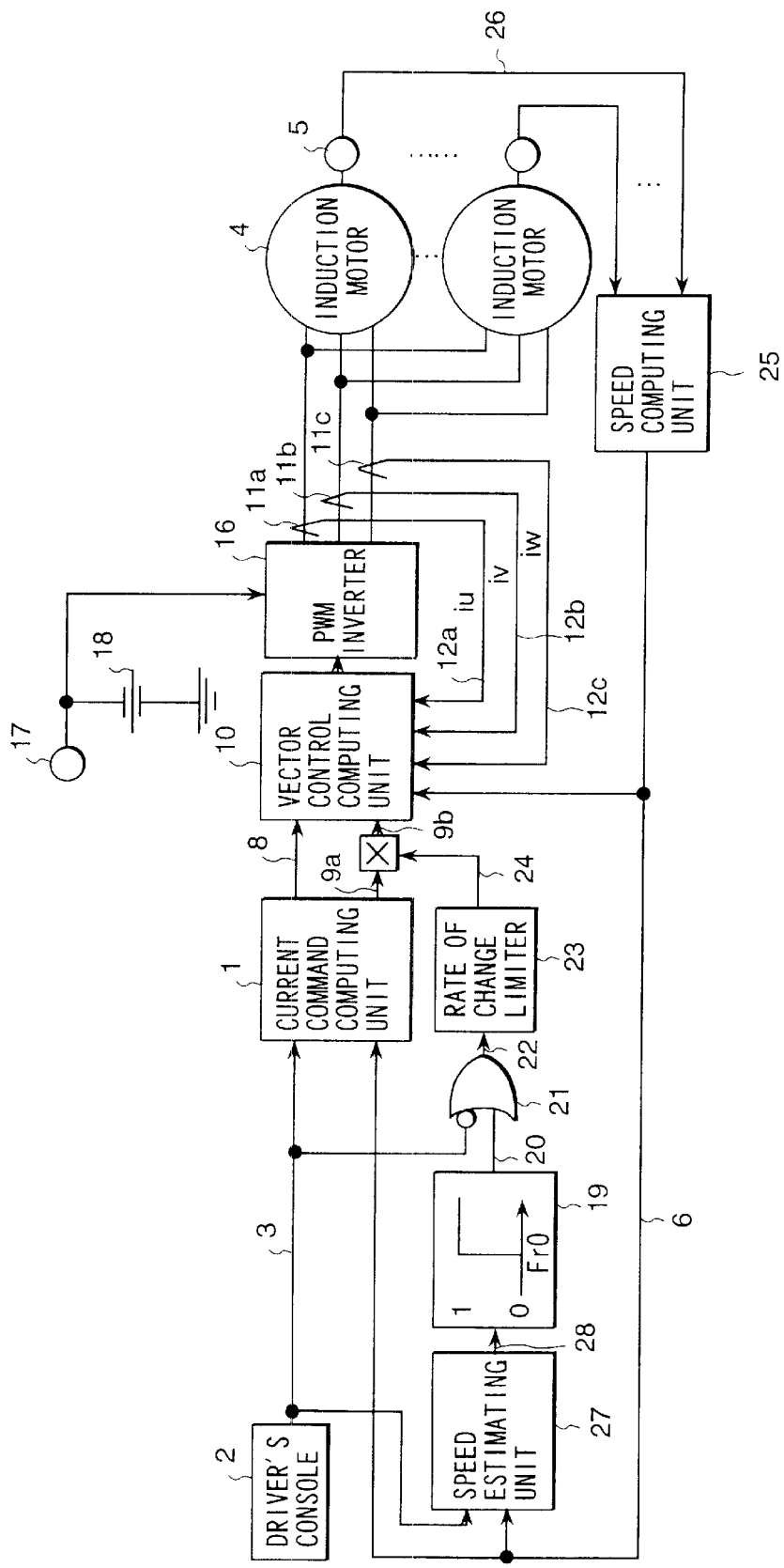
FIG. 1 is a block diagram showing an embodiment of a control apparatus for an electric vehicle according to the present invention.

In FIG. 1, one or plural induction motors 4 are provided for an electric vehicle, to be used for driving the electric vehicle and for effecting regenerative braking thereof in response to an instruction from a driver's console 2. In the control apparatus, a current command computing unit 1 receives a brake command flag 3, which is output as "1" while the brake is being applied from the driver's console 2, and a reference rotational speed signal 6, thereby generating an excitation current command 8 and a torque current pattern 9a.

Here, the reference rotational speed signal 6 is derived by a speed computing unit 25 using rotational speed signals 26 which are obtained from rotational speed detectors 5 that are coupled to the single or plural induction motors 4 (or to wheels not shown in the figure) according to a specific set of rules. One example of such a rule is where a maximum value of the rotational speed detection values from the plural rotational speed detectors 5 is taken as the reference rotational speed signal 6.

A vector control computing unit 10 receives the reference rotational speed signal 6, an excitation current command 8, a torque current pattern 9b, and motor current detection values 12a, 12b, and 12c, which are obtained from current detectors 11a, 11b and 11c, respectively, and generates a voltage command 13 for the output voltage of an inverter.

The voltage command 13 is input to a pulse width modulation inverter (hereinafter referred to as a PWM inverter) 16, and the gate signals computed from the voltage command 13 are used to operate the switching devices constituting the main circuit, whereby the DC power obtained from the DC power supply 17 via a filter capacitor 18 is converted into three-phase power, and, in turn is supplied to the induction motors 4.

The brake command flag 3 and the reference rotational speed signal 6 are also input to a speed estimating unit 27, and when the reference rotational speed signal 6 comes to be less than a certain set value Frb(Hz), while the brake is being applied, the rate of deceleration β(Hz/s) at that time is obtained by differentiating the reference rotational speed signal 6 and storing the result, whereby the estimated rotational speed signal 28 computed according to the following equation is output.

$$Frh = Frb - \beta t \quad (1)$$

Here, Frh(Hz) is the estimated rotational speed signal 28, Frb(Hz) is the speed at which the speed estimation is started, β(Hz/s) is the stored value of a deceleration at Frb(Hz), and t (seconds) is the time, taking the instant of time when it becomes lower than Frb(Hz) as zero.

The estimated rotational speed signal 28 is input to a comparator 19 which outputs a speed flag 20 that becomes "1" when the estimated rotational speed signal 28 is larger than a certain speed Fr0(Hz) which is described later. A logical summation circuit 21 generates an electric brake operation flag 22 from the negation of the brake command flag and the speed flag 20. In other words, the electric brake operation flag 22 becomes "1" when the estimated rotational speed signal 28 is higher than Fr0(Hz) during powered movement, powerless movement, and braking, and becomes "0" when the estimated rotational speed signal 28 is less than or equal to Fr0(Hz).

A brake torque decreasing signal 24 is output by a rate of change limiter 23, which takes as a lower limit the limiter value taking the electric brake operation flag as the input–1/td (1/s). The brake torque decreasing signal 24 is multiplied by the torque current pattern 9a, and, hence, the torque current pattern 9a decreases in a ramp fashion in a period of td (s) when the reference rotational speed signal 6 becomes less than Fr0(Hz) during braking, whereby the torque current pattern 9b is formed.

In this manner, with the torque current pattern 9b reduced in a ramp fashion, the shock at the time of releasing the electric brake is subdued, thereby preventing deterioration of the riding comfort. Here, Fr0(s) which is the starting speed at which the torque current starts to be reduced during braking and td (s) which is the period of the reduction of the torque current are set so that the electric vehicle surely stops, while securing a good riding comfort.

Figure 2:
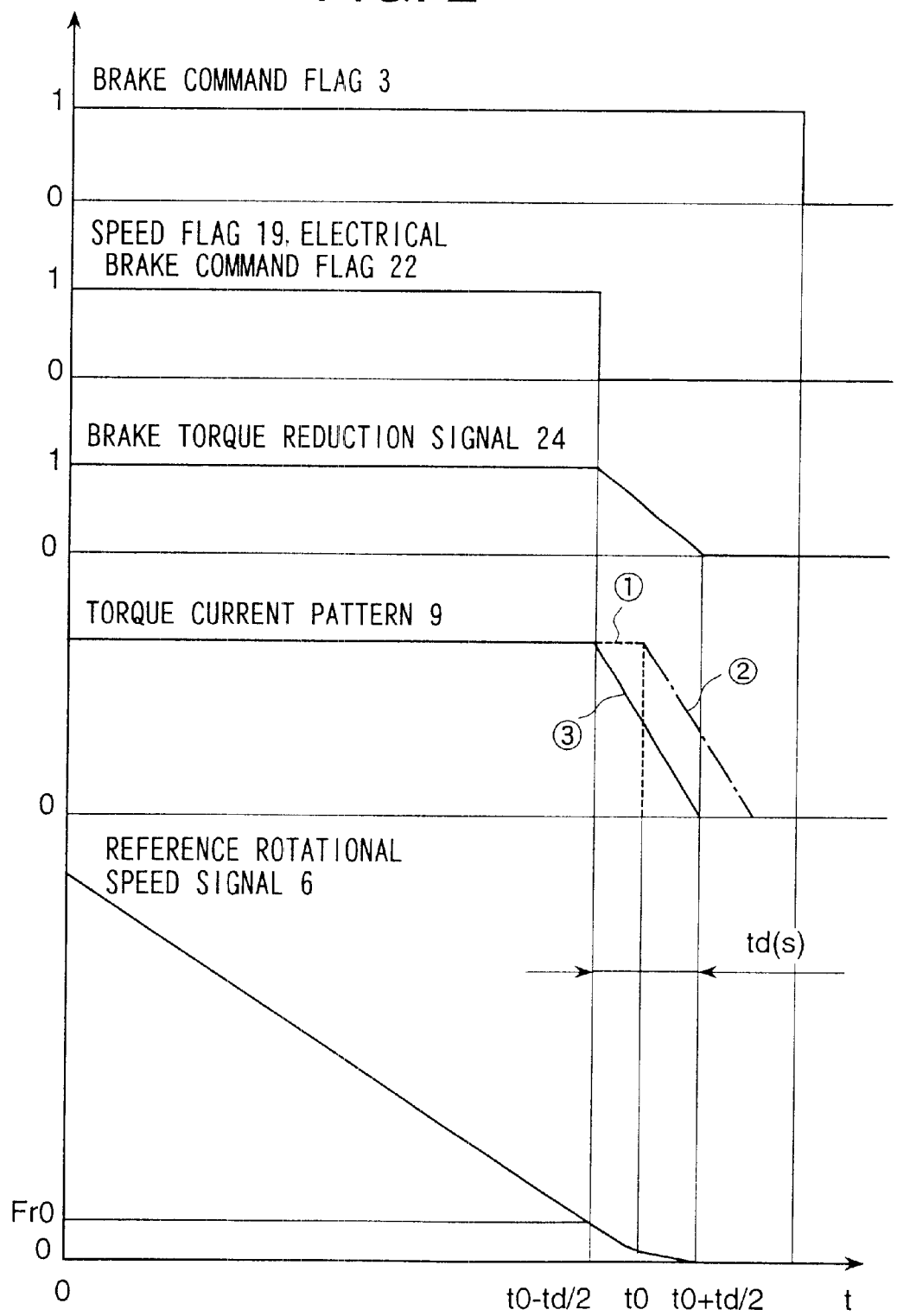
FIG. 2 is a graphical illustration showing waveforms indicating temporal relationships between the speed during braking and signals of different sections in the embodiment of the control apparatus of an electric vehicle according to the present invention.

FIG. 2 is a diagram of waveforms showing the temporal relationship between the speed and the signals of different sections during braking in the embodiment of the control apparatus for an electric vehicle according to the present invention.

At the instant of time 0, the brake command flag 3 is "1" indicating that the brake has been applied. At this point, the speed flag 19 and the electric brake operation flag 22 are "1" during the period when the reference rotational speed signal 6 is sufficiently high. Here, in order to maintain a decrease in speed at a constant rate and to stop the vehicle at a speed t0, as indicated by the dotted line of the reference rotational speed signal 6, it is possible to conceive a method of step-wise reduction of the torque current pattern 9 at time t0 as indicated by the pattern (1).

However, changing the torque current pattern 9 suddenly in this manner is not desirable because it causes the riding comfort to become bad due to the generation of shocks caused by a sudden change in the braking force. In view of this, it is possible to alleviate the shock due to a sudden change in the braking force by reducing the torque current in a ramp fashion, as indicated by the dot-and-dash line of pattern (2) during the period td (s) starting from the instant t0. However, if a decreasing of the torque current pattern is started at time t0 (s), there will still be a forward driving force during the period td (s) after the instant to (s), and it will not be possible to maintain the stopped condition.

Here, if the speed flag 19 (the electric brake operation flag 22) is lowered earlier than the instant of time t0 (s) when it is assumed that the vehicle will come to a stop at a constant deceleration a time interval of td/2 (s) which is half the duration of ramp type reduction in the torque current pattern 9, the reference rotational speed signal 6 becomes zero exactly at the instant of time (t0+td/2) (s) when the torque current pattern 9 has decreased completely to zero, and hence it is possible to stop the vehicle completely and to maintain the stopped state.

From the above, the rotational speed Fr0(Hz) at which the speed flag 19 has to be lowered when stopping the vehicle completely by reducing the torque current pattern 9 in a ramp fashion during an interval of td (s) when the speed is being decelerated at a constant deceleration of β(Hz/s) is obtained using the following equation.

$$Fr0 = \beta \times td/2 \quad (2)$$

Further, the rotational speed Fr0(Hz) at which the speed flag 19 has to be lowered considering the delay dt of the detection of the reference rotational speed signal 6 is obtained using the following equation.

$$Fr0 = \beta \times (td/2 + dt) \quad (3)$$

Here, the delay dt of the detection of the reference rotational speed signal 6 can be a time constant of the first order delay element introduced in order to remove the noise, etc.

A second embodiment of a control apparatus from electric vehicle according to the present invention will be described with reference to FIG. 3.

Figure 3:
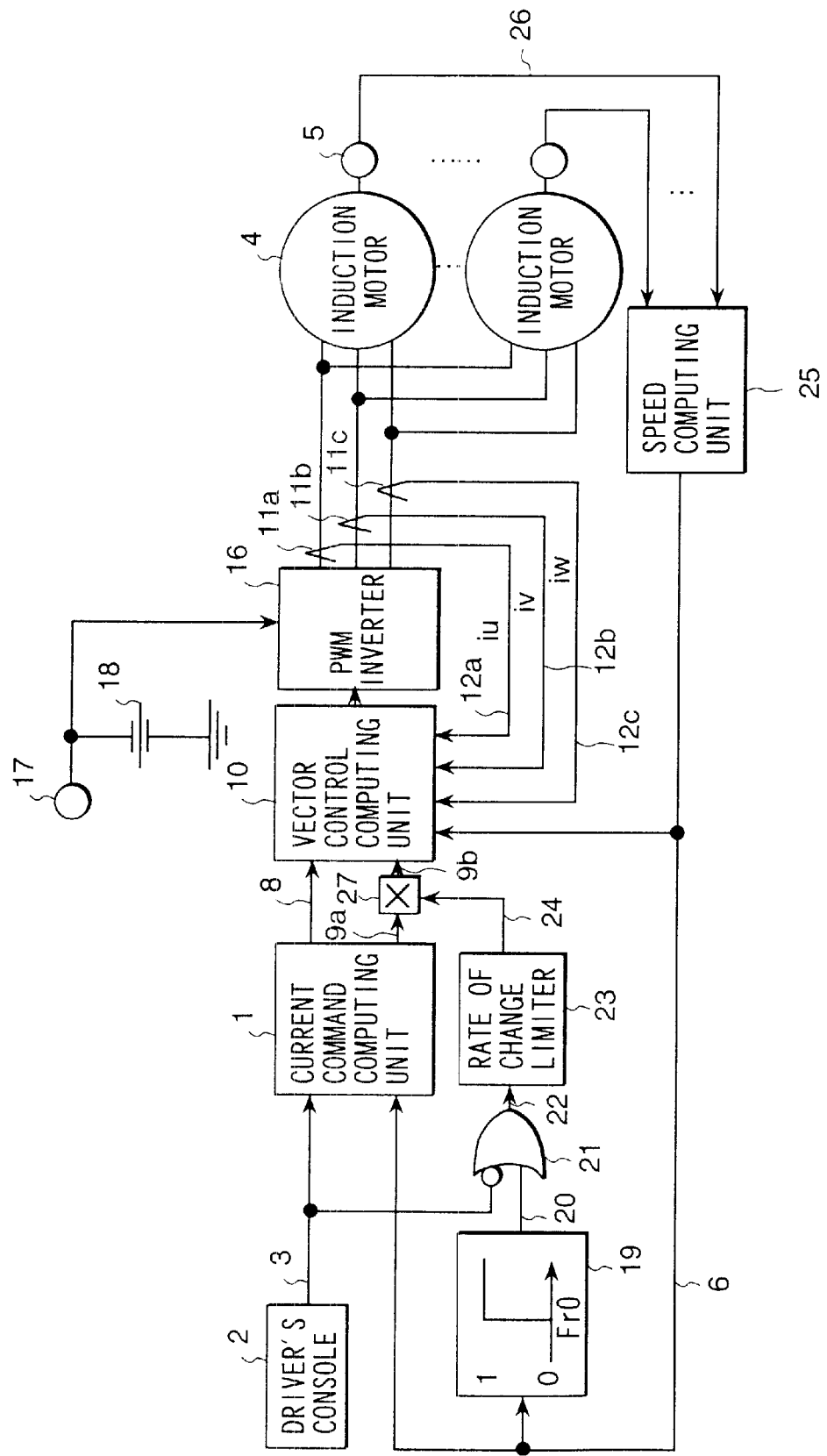
FIG. 3 is a block diagram showing a second embodiment of a control apparatus for an electric vehicle according to the present invention.

The control apparatus for an electric vehicle as shown in FIG. 3 is not provided with the estimating unit 27 shown in FIG. 1. In the control apparatus of FIG. 3, a brake command flag 3, which is output as "1" when the brake is being applied in the driver's console 2, and a reference rotational speed signal 6 are input to the current command computing unit 1, thereby generating an excitation current command 8 and a torque current pattern 9a.

Here, the reference rotational speed signal 6 is derived by a speed computing unit 25 using rotational speed signals 26 derived from the rotational speed detectors 5 coupled to a single or plural induction motors 4 (or to a wheel not shown in the figure) according to a specific set of rules, as in the first embodiment.

The vector control computing unit 10 inputs the reference rotational speed signal 6, the excitation current command 8, the torque current pattern 9b and motor current detection values 12a, 12b and 12c, which are obtained from the current detectors 11a, 11b, and 11c, respectively, and generates a voltage command 13 for the output voltage of the inverter.

The voltage command 13 is input to the PWM inverter 16, and the gate signals computed from the voltage command 13 are used to operate the switching devices constituting the main circuit, whereby the DC power obtained from the DC power supply 17 via a filter capacitor 18 is converted into three-phase power, which, in turn, is supplied to the induction motors 4.

The reference rotational speed signal 6 also is input to the comparator 19, which outputs a speed flag 20 when the reference rotational speed signal 6 is larger than Fr0(Hz).

The logical summation circuit 21 generates the electric brake operation flag 22 from the negation of the brake command flag 3 and the speed flag 20. In other words, the electric brake operation flag 22 becomes "1" when the rotational speed signal 28 is higher than Fr0(Hz) during powered movement, powerless movement, and braking, and becomes "0" when the estimated rotational speed signal 28 is less than or equal to Fr0(Hz).

A brake torque decreasing signal 24 is output by the rate of change limiter 23, which takes as the lower limit the limiter value taking the electric brake operation flag as the input−1/td (1/s). The brake torque decreasing signal 24 is multiplied by the torque current pattern 9a, and, hence, the torque current pattern decreases in a ramp fashion with a period of td (s) when the rotational speed signal 6 becomes less than Fr0(Hz) during braking.

In this manner, by reducing the torque current pattern 9b in a ramp fashion, the shock generated at the time of releasing the electric brake is subdued, thereby preventing deterioration of the riding comfort. Here, Fr0(s) which is the starting speed of reducing the torque current and td (s) which is the period of reducing the torque current at the time of braking are set so that sure stopping is carried out, while also obtaining a good riding comfort.

A third embodiment of the present invention will be described hereunder with reference to FIG. 4, which is a block diagram showing the third embodiment of a control apparatus for an electric vehicle according to the present invention.

Figure 4:
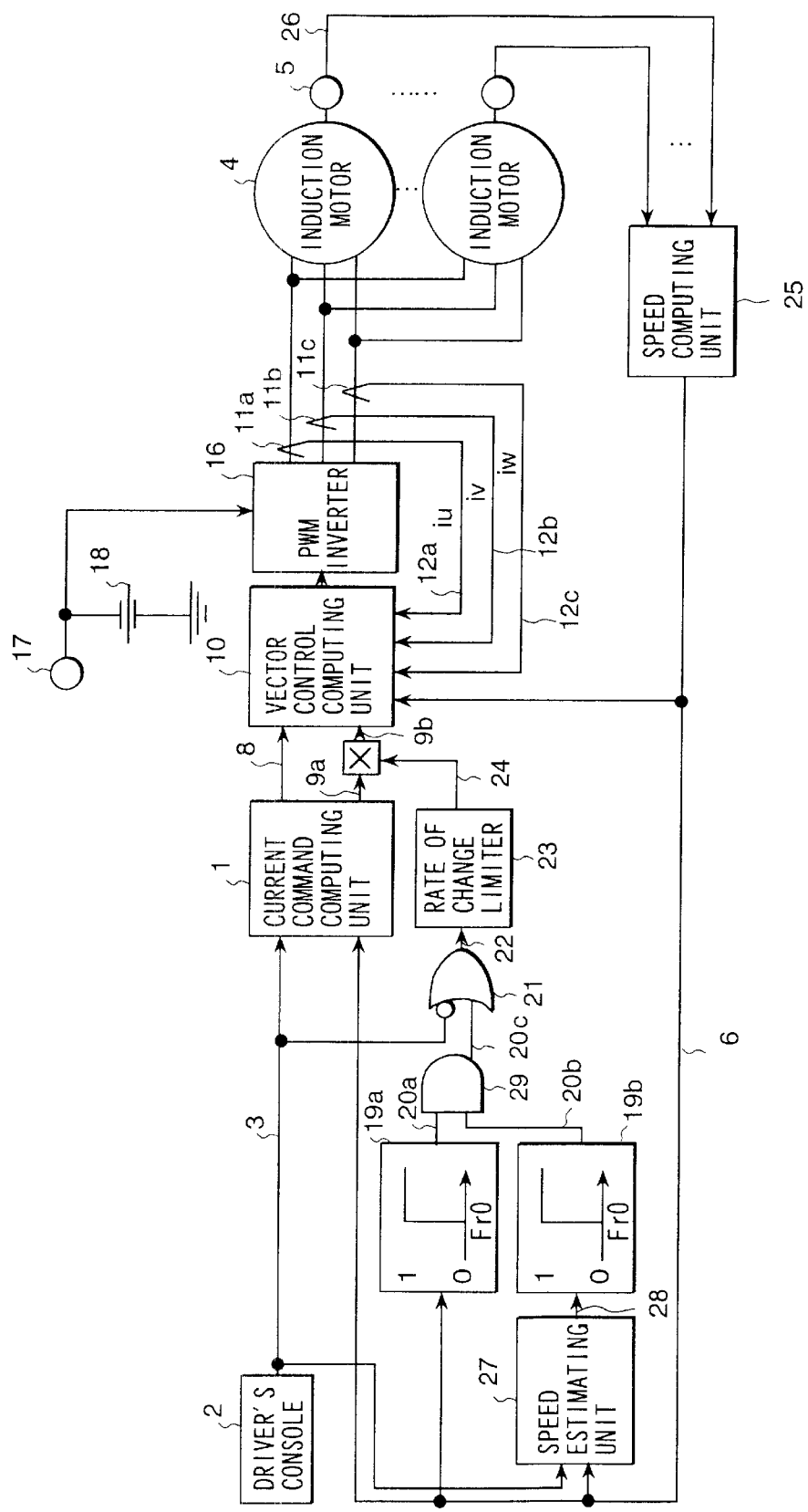
FIG. 4 is a block diagram showing a third embodiment of a control apparatus for an electric vehicle according to the present invention.

In the control apparatus of an electric vehicle, as seen in FIG. 4, a brake command flag 3, which is output as "1" while the brake is being applied in the driver's console 2, and a reference rotational speed signal 6 are input to the current command computing unit 1, thereby generating an excitation current command 8 and a torque current pattern 9a.

Here, the reference rotational speed signal 6 is derived by the speed computing unit 25 using rotational speed signal 26 derived from the rotational speed detectors 5 coupled to the single or plural induction motors 4 (or to a wheel not shown in the figure) according to a specific set of rules, as in the first embodiment.

The reference rotational speed signal 6, the excitation current command 8, the torque current pattern 9b and electric motor current detection values 12a, 12b, and 12c, which are obtained from the current detectors 11a, 11b and 11c, respectively, are input to the vector control computing unit 10, thereby generating a voltage command 13 for the output voltage of the PWM inverter 16. The voltage command 13 is input to the PWM inverter 16, and gate signals computed from the voltage command 13 are used to operate the switching devices constituting the main circuit, whereby the DC power obtained from the DC power supply 17 via the filter capacitor 18 is converted into three-phase power, which, in turn, is supplied to the induction motors 4.

The brake command flag 3 and the reference rotational speed signal 6 are input to the speed estimating unit 27, and when the reference rotational speed signal 6 is less than a certain set value Frb(Hz) when the brake is applied, the deceleration β(Hz/s) at that time is obtained by differentiating the reference rotational speed signal 6 and the result is stored, whereby the estimated rotational speed signal 28 computed according to the following equation is output.

$$Frh = Frb - \beta t \qquad (4)$$

Here, Frh(Hz) is the estimated rotational speed signal 28, Frb(Hz) is the speed at which the speed estimation is started, β(Hz/s) is the memorized value of the deceleration at Frb(Hz), and t (seconds) is the time, taking the instant of time when it becomes lower than Frb(Hz) as zero.

The reference rotational speed signal 6 is input to the comparator 19a which outputs a speed flag 20a that becomes "1" when the reference rotational speed signal 6 is larger than Fr0(Hz). The estimated rotational speed signal 28 is input to the comparator 19b, which outputs a speed flag 20b that becomes "1" when the estimated rotational speed signal 28 is larger than Fr0(Hz).

The logical summation circuit 29 generates a speed flag 20c by logically summing the speed flags 20a and 20b. In other words, the speed flag 20c becomes "1" when either or both of the speed flags 20a and 20b are "1".

The logical summation circuit 21 generates the electric brake operation flag 22 from the negation of the brake command flag 3 and the speed flag 20c. In other words, the electric brake operation flag 22 becomes "1" when the estimated rotational speed signal 28 is higher than Fr0(Hz) during powered movement, powerless movement, and braking, and becomes "0" when the reference rotational speed 6 or the estimated rotational speed signal 28 is less than or equal to Fr0(Hz).

A brake torque decreasing signal 24 is output by the rate of change limiter 23, which takes as the lower limit the limiter value taking the electric brake operation flag 22 as the input−1/td (1/s). The brake torque decreasing signal 24 is multiplied by the torque current pattern 9a, and, hence, the torque current pattern decreases in a ramp fashion with a period of td (s) when the reference rotational speed signal 6 or the estimated rotational speed 28 becomes less than Fr0(Hz) during braking.

In this manner, by having the torque current pattern 9b reduced in a ramp fashion, the shock generated at the time of releasing the electric brake is subdued, thereby preventing deterioration of the riding comfort. Here, Fr0(s) which is the starting speed of reducing the torque current and td (s) which is the period of reducing the torque current at the time of braking are set so that sure stopping is carried out, while also obtaining a good riding comfort.

Figure 5:
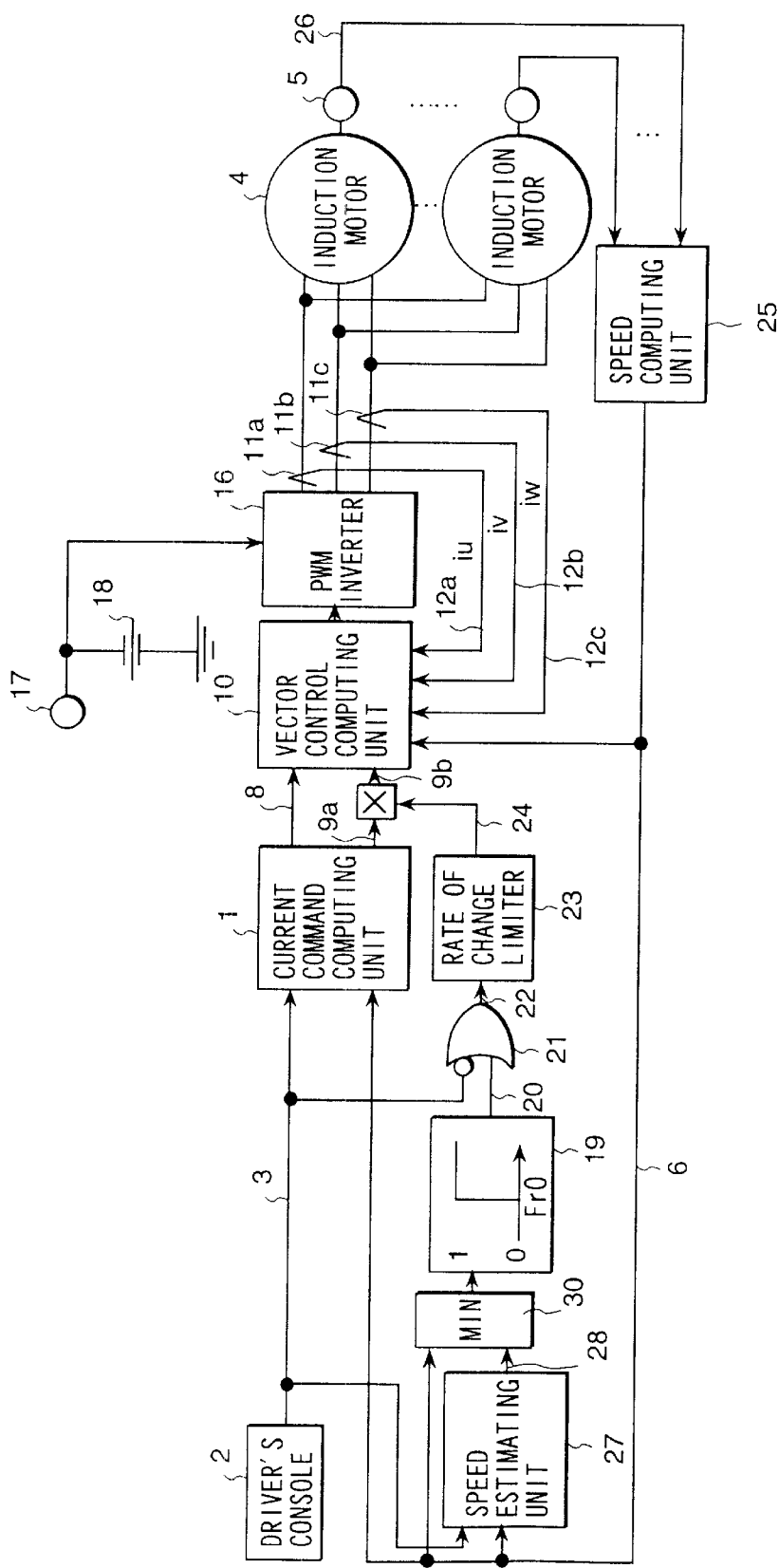
FIG. 5 is a block diagram showing a fourth embodiment of a control apparatus for an electric vehicle according to the present invention.

Still another embodiment of the present invention will be described hereunder with reference to FIG. 5, which is a block diagram showing a fourth embodiment of a control apparatus for an electric vehicle according to the present invention. In FIG. 5, a brake command flag 3, which is output as "1" while the brake is being applied in the driver's console 2, and a reference rotational speed detection signal 6 are input to the current command computing unit 1, thereby generating an excitation current command 8 and a torque current pattern 9a. Here, the reference rotational speed signal 6 is derived by the speed computing unit 25 using rotational speed signals 26 derived from the rotational speed detectors 5, which are coupled to the single or plural induction motors 4 (or to a wheel not shown in the figure) according to a specific set of rules, as in the first embodiment.

The reference rotational speed signal 6, the excitation current command 8, the torque current pattern 9b and electric motor current detection values 12a, 12b, and 12c, which are obtained from the current detectors 11a, 11b and 11c, respectively, are input to the vector control computing unit 10, thereby generating a voltage command 13 for the output voltage of the PWM inverter 16. The voltage command 13 is input to the PWM inverter 16, and gate signals computed from the voltage command 13 are used to operate the switching devices constituting the main circuit, whereby the DC power obtained from the DC power supply 17 via the filter capacitor 18 is converted into three-phase power, which, in turn, is supplied to the induction motors 4.

The brake command flag 3 and the reference rotational speed signal 6 are input to the speed estimating unit 27, and when the reference rotational speed signal 6 is less than a certain set value Frb(Hz) at a time when the brake is applied, the deceleration β(Hz/s) at that time is obtained by differentiating the reference rotational speed signal 6 and the result is stored, whereby the estimated rotational speed signal 28 computed according to the following equation is output.

$$Frh = Frb - \beta t \quad (5)$$

Here, Frh(Hz) is the estimated rotational speed signal 28, Frb(Hz) is the speed at which the speed estimation is started, β(Hz/s) is the stored value of the deceleration at Frb(Hz), and t (seconds) is the time, taking the instant of time when it becomes lower than Frb(Hz) as zero.

The reference rotational speed signal 6 is input to the comparator 19a, which outputs a speed flag 20a that becomes "1" when the reference rotational speed signal 6 is larger than Fr0(Hz). The estimated rotational speed signal 28 is input to the comparator 19b, which outputs a speed flag 20b that becomes "1" when the estimated rotational speed signal 8 is larger than Fr0(Hz).

The reference rotational speed signal 6 and the estimated rotational speed signal 28 are input to the selector 30, which selects the lower of the two speed signals and outputs it as a minimum rotational speed signal 31. The minimum rotational speed signal 31 is input to the comparator 19, which outputs the speed flag 20a, which becomes "1" when the minimum rotational speed signal 31 is larger than Fr0 (Hz).

The logical summation circuit 21 generates the electric brake operation flag 22 from the negation of the brake command flag 3 and the speed flag 20c. In other words, the electric brake operation flag 21 becomes "1" when the reference rotational speed signal 6 and the estimated rotational speed signal 28 are both higher than Fr0 (Hz) during powered movement, powerless movement, and braking, and becomes "0" when the reference rotational speed 6 or the estimated rotational speed signal 28 is less than or equal to Fr0(Hz).

A brake torque decreasing signal 24 is output by the rate of change limiter 23, which takes as a lower limit the limiter value taking the electric brake operation flag as the input −1/td (1/s). The brake torque decreasing signal 24 is multiplied by the torque current pattern 9a, and hence the torque current pattern decreases in a ramp fashion with a period of td (s) when the reference rotational speed signal 6 or the estimated rotational speed 28 becomes less than Fr0(Hz) during braking.

In this manner, by having the torque current pattern 9b reduced in a ramp fashion, the shock at the time of releasing the electric brake is subdued, thereby preventing deterioration of the riding comfort. Here, Fr0(s) which is the starting speed of reducing the torque current and td (s) which is the period of reducing the torque current at the time of braking are set so that stopping is ensured, while also obtaining a good riding comfort.

According to the present invention, deterioration of the riding comfort can be prevented by decreasing the braking force at the terminal speeds at a prescribed rate of change, and it is possible to stop completely by deriving the timing for release of electrical brake from the motor rotational speed and deceleration of rotation considering the rate of change of reduction of the braking force at the terminal speeds and the delay in speed detection.

What is claimed is:

1. A control apparatus for an electric vehicle comprising an electric power converter for at least an electric motor, a speed detector for detecting the speed of said electric motor, a controller for controlling said electric power converter to control the torque of said electric motor, and a computing unit for computing deceleration, based on the detected speed of said electric motor which is output by said speed detector, wherein on the basis of the detected speed of said electric motor and the deceleration at the time when the detected speed of said electric motor falls below a prescribed speed, a subsequent speed of said electric motor is estimated; and torque control of said electric motor is carried out by said controller, based on the estimated speed.

2. A control apparatus for an electric vehicle according to claim 1, wherein said torque control is carried out so that the torque of the electric motor is decreased at a predetermined deceleration at the time that the estimated speed of the electric motor falls below said prescribed speed.

3. A control apparatus of electric vehicle according to claim 2, wherein said controller controls the torque of said electric motor so as to be decreased in a ramp fashion to zero.

4. A control apparatus for an electric vehicle comprising an electric power converter for at least an electric motor, an electric motor speed detector for detecting the speed of said electric motor, and a controller for controlling said electric power converter to control the torque of said electric motor, wherein when the detected speed of said electric motor reaches a prescribed speed while said power converter is being controlled on the basis of a torque pattern outputted from said controller so that the speed of said electric motor decreases, said controller controls the torque of said electric motor so that a brake torque of said electric motor decreases to zero in a prescribed time.

5. A control apparatus for an electric vehicle according to claim 4, wherein there is provided a speed estimating unit for estimating, on the basis of the detected speed of said electric motor at the time when the detected speed of said electric motor falls below said prescribed speed, the subsequent speed of said electric motor, and the torque control is carried out so that the torque is decreased at a prescribed rate of change at the time that the detected speed of said electric motor or the estimated speed of said electric motor falls below said prescribed speed.

6. A control apparatus of electric vehicle according to claim 5, wherein said controller controls the torque of said electric motor so as to be decreased in a ramp fashion to zero.

7. A control apparatus for electric vehicles according to claim 4, wherein there is provided a speed estimating unit for estimating, on the basis of the detected speed of said electric motor at the time when the detected speed of said electric motor falls below said prescribed speed, a subsequent speed of said electric motor, and said controller carries out torque control so that the torque is decreased at a prescribed rate of change at the time that the detected speed of said electric motor and the estimated speed of said electric motor falls below said prescribed speed.

8. A control apparatus of electric vehicle according to claim 7, wherein said controller controls the torque of said electric motor so as to be decreased in a ramp fashion to zero.

9. A control apparatus of electric vehicle according to claim 4, wherein said controller controls the torque of said electric motor so as to be decreased in a ramp fashion to zero.

10. A control apparatus for an electric vehicle comprising an electric power converter for at least an electric motor, an electric motor speed detector for detecting the speed of said electric motor, a controller for controlling said electric power converter to control the torque of said electric motor, and a computing unit for computing deceleration, based on the detected speed of said electric motor, wherein based on the detected speed of said electric motor and the deceleration at the time when the detected speed of said electric motor falls below a prescribed speed, speed of said electric motor subsequent to the time is estimated, and said controller carries out torque control so that brake torque of said electric motor decreases to zero when at least one of the detected speed and the estimated speed reach a prescribed speed.

11. A control apparatus of electric vehicle according to claim 10, wherein said controller controls the torque of said electric motor so as to be decreased in a ramp fashion to zero.

* * * * *